March 13, 1956  P. M. KLAUBER  2,737,775
AFTERBURNER ELECTRIC CONTROLS
Filed Sept. 15, 1950  3 Sheets-Sheet 1
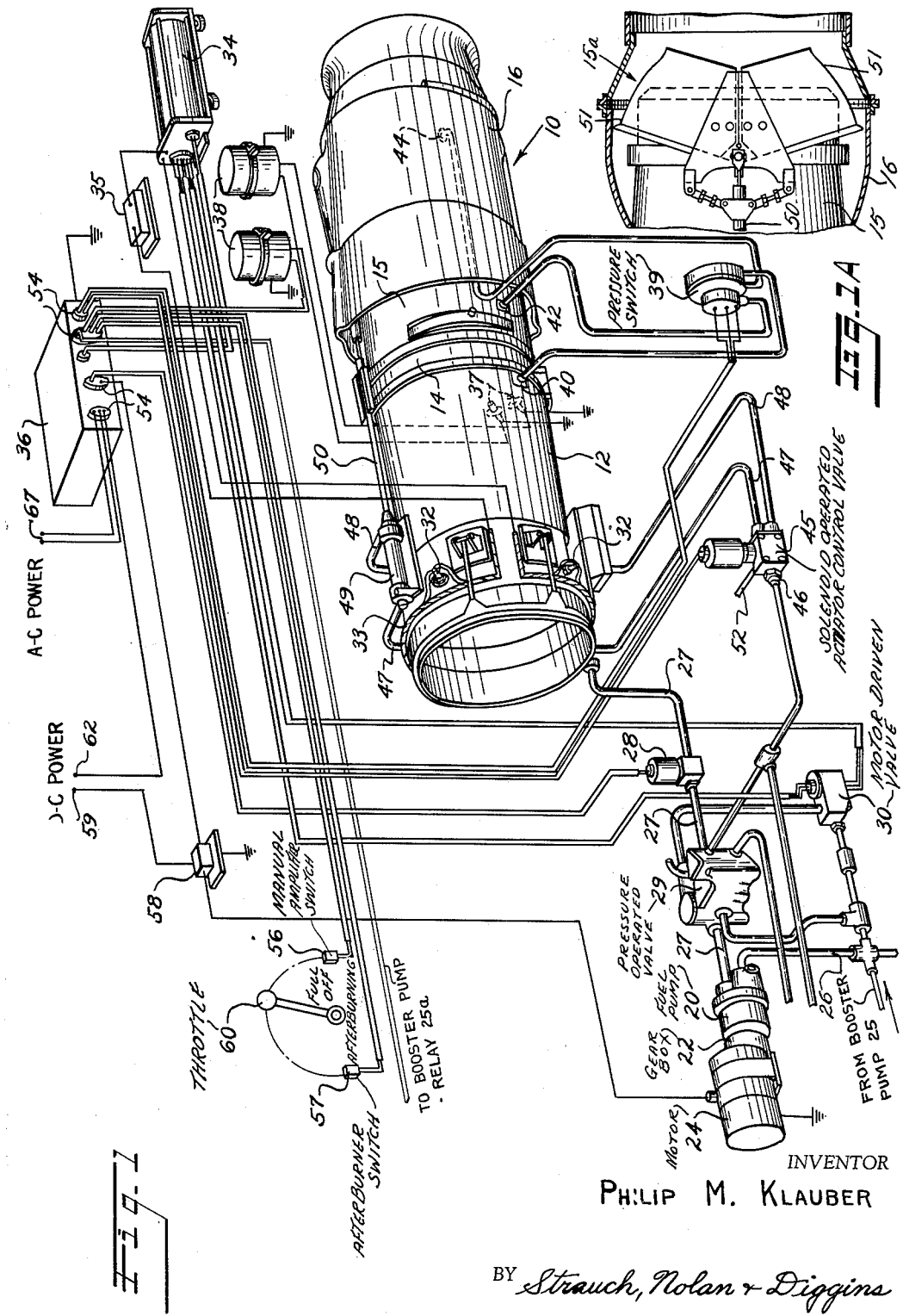
INVENTOR
PHILIP M. KLAUBER
BY Strauch, Nolan & Diggins
ATTORNEYS

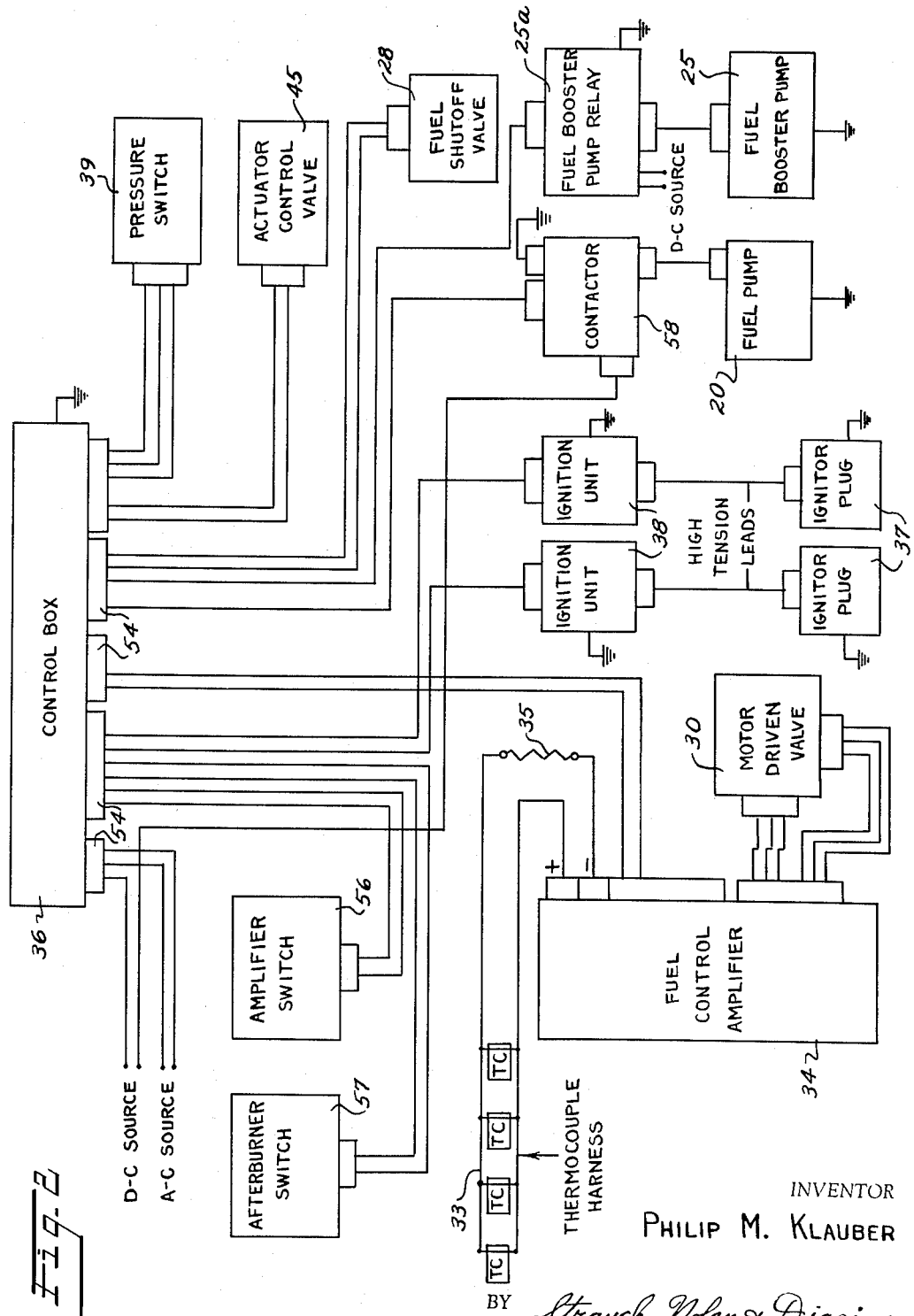

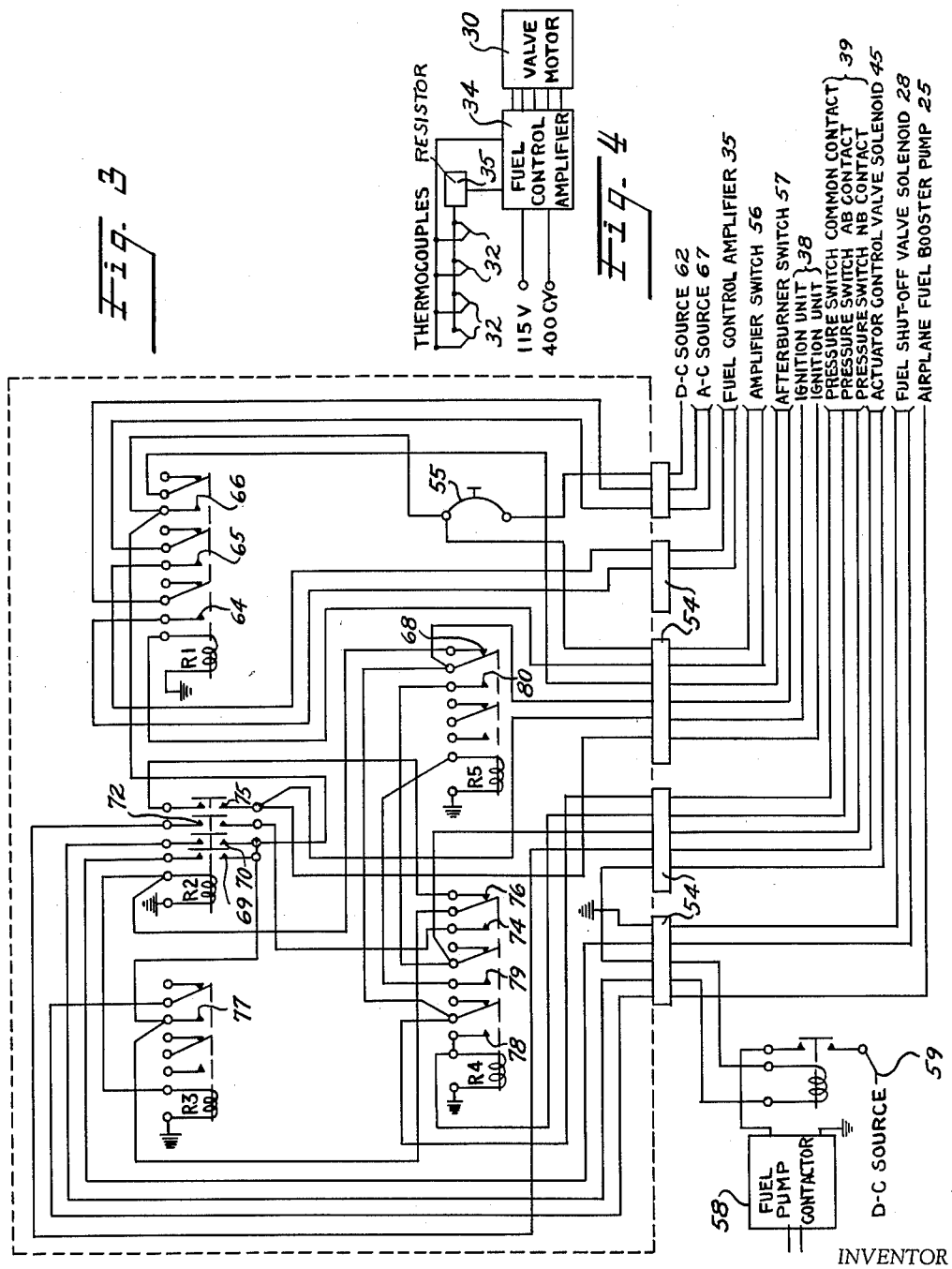

United States Patent Office 2,737,775
Patented Mar. 13, 1956

2,737,775
AFTERBURNER ELECTRIC CONTROLS

Philip M. Klauber, San Diego, Calif., assignor to Solar Aircraft Company, San Diego, Calif., a corporation of California Application September 15, 1950, Serial No. 185,115

5 Claims. (Cl. 60—35.6)

This invention relates to electrical control systems, and has particular reference to the electrical power supply and controls for regulating fuel supply, nozzle position and like systems. While the preferred embodiment of the invention disclosed herein is particularly adapted for use in connection with the fuel and nozzle control of a jet engine afterburner assembly, it is to be understood that the invention may be applied to control of a multitude of operations simultaneously or in sequence in various other types of control systems, such for example as a turbojet engine without an afterburner assembly.

In a turbojet power plant having an afterburner assembly with a variable area nozzle, proper regulation of fuel flow to the afterburner and of the nozzle position of the variable area nozzle is of great importance. If the afterburner is switched on and the nozzle fails to adjust itself to a larger opening, there is a decrease in the propulsive thrust effect of the primary engine exhaust gases rather than the expected increase. The same is true if the nozzle fails to adjust to a smaller opening after the afterburner has been switched off or there has been an involuntary shut off due to blowout or other reasons. Also, once afterburning has been initiated it is essential to the proper operation and safety of the plane, that the fuel flow to the afterburner fuel inlet be closely regulated to compensate for all possible conditions of flight such as variable altitude, air speed, ambient pressures and temperatures.

To control the performance of the afterburner assembly so that it will function properly at all times and under all flight conditions a reliable and rapidly responsive control system must be provided. This is especially so, since at present the afterburner is normally called upon to serve its purpose as a thrust augmenter only in time of a real need for additional power such as during takeoff, waveoff or tactical or combat emergencies. Therefore, it is of primary importance that the afterburner respond quickly and faithfully when called upon, or the real purpose for providing an afterburner assembly will not be served and the plane with its crew may be lost. It should also be noted that these same considerations will continue to be of importance in the future when the afterburner is used more and more as a primary source of power, as many designers think will be the case with continuing increased airspeeds and altitudes.

The novel electrical control system disclosed herein, when used in connection with other non-electrical afterburner assembly controls, allows quick acting and completely automatic afterburner assembly operation from the time the afterburner is switched on until it is switched off, and in addition it automatically causes a return to normal condition in case of blowout or involuntary shut off. By means of my system, afterburner combustion and nozzle operation are accurately coordinated and fuel flow to the afterburner is regulated closely in response to varying conditions of flight.

With these and other considerations in view it is a prime object of this invention to provide an automatic electrical control system capable of rapidly performing a multitude of control operations simultaneously or sequentially.

It is a further important object of this invention to provide an electrical control system which enables safe and dependable performance of an afterburner assembly whenever needed.

Another object of this invention is to provide an electrical control system which allows completely automatic operation of an afterburner assembly for any condition of flight.

A further object of the invention is to provide an electrical control system which enables rapid and accurate coordination between variations in combustion within an afterburner assembly and operation of the variable area nozzle.

A still further object of the invention is to provide an electrical control system wherein the fuel feed to an afterburner is closely regulated in response to varying conditions of flight.

Another object of the invention is to provide an electrical control system which will automatically return an afterburner assembly to normal inoperative condition in the event of an involuntary shut down.

Other objects and advantages will be apparent from the following description in conjunction with the accompanying drawings and from the appended claims. The accompanying drawings in which like reference numerals are used to designate similar parts throughout, illustrate the preferred embodiments for the purpose of disclosing the invention. The drawings, however, are not to be taken in a limiting or a restrictive sense since it will be apparent to those skilled in the art that various changes in the illustrated construction may be resorted to without in any way exceeding the scope of the invention.

In the drawings:

Figure 1 illustrates a schematic perspective of an afterburner assembly and control system embodying the invention;

Figure 1a is a fragmentary top plan view of a portion of the engine shown in Figure 1 with parts broken away to show interior details of the variable area nozzle;

Figure 2 illustrates a schematic wiring diagram of the electrical control system embodying the invention;

Figure 3 illustrates an internal wiring diagram for the control box of the electrical control system; and Figure 4 illustrates a schematic wiring diagram for the temperature responsive motor driven valve unit.

Referring to Figure 1 of the drawings an afterburner assembly is generally indicated at 10. Afterburner assembly 10 comprises a diffuser section 12, and afterburner housing or shell 14, a nozzle section 15 and a cooling shroud 16. The variable area nozzle, indicated generally at 15a, Figure 1a, is mounted upon the end of nozzle section 15 and is completely surrounded by shroud 16. The variable area nozzle 15a may be of the two-position type disclosed in copending application Serial No. 185,124.

Illustrated in Figure 1 are a number of non-electrical units which coact with the electrical control system of this invention to make up a complete afterburner assembly control system. Since the invention in its present embodiment is particularly adapted to an afterburner assembly control system these non-electrical units and the way in which they coact with my novel electrical controls will be briefly described herein in order to insure a full and complete understanding of the invention and its operation. These non-electrical units, however, are not a part of this invention, either singly or in combination, and therefore will be described in no more detail than necessary. For a full disclosure of the details of these units reference may be had to said copending application Serial No. 185,124, filed on even date by Robert E. Day for Afterburner Controls.

The afterburner assembly control system as a whole will now be generally described. Fuel is pumped to the afterburner fuel manifold, not shown, by means of a fuel pump 20 which is directly connected to a speed reducing gear box 22 on the drive end of a D.-C. series wound motor 24 controlled by the electrical control system to be described. Pump 20 receives fuel via a booster pump 25, controlled by booster pump relay 25a, Figure 2, from the main aircraft supply through line 26 and discharges it through line 27 which conducts it to the afterburner fuel manifold located in burner housing 14. The afterburner may be of any suitable type, but is preferably of the compound gutter type disclosed in Patent No. 2,701,444.

A fuel shut-off valve 28 and a pressure operated valve 29 are mounted in the fuel line 27 between pump 20 and the fuel manifold. Shut-off valve 28 is a normally closed solenoid actuated valve which is moved to open position to allow free passage of fuel through it when the afterburner is switched on as will be hereinafter described. Pressure operated valve 29 is placed in line 27 to provide broad fuel regulation and is responsive to the variations in pressure rise across the air compressor, not shown, of the primary jet engine. A motor driven valve 30 is mounted in a by-pass line around valve 29 and cooperates with valve 29 to provide a fine fuel regulation. Valve 30 is responsive to temperature variations of the primary engine turbine outlet as will be described. The details of valves 29 and 30 and coaction therebetween are fully described in said copending application Serial No. 185,124 for Afterburner Controls.

The variations in turbine outlet temperatures are measured by means of four "chromel-alumel" thermocouples 32, Figures 1 and 4, mounted at the upstream end of the diffuser section 12 as shown in Figure 1. The "chromel-alumel" terminals are connected in parallel to similar terminals on a thermocouple harness 33 as may be best seen from the schematic diagram of Figure 4. The dissimilar metals at the tips of the thermocouples generate a millivolt D.-C. power which varies according to temperature changes of the exhaust gases. This power is transmitted through harness 33 to a fuel control amplifier 34. There it functions as a controlling means to regulate a variable A.-C. power circuit between amplifier 34 and motor driven valve 30. A resistor 35 is installed in the circuit between harness 33 and amplifier 34 to adjust the total thermocouple resistance to the desired value upon first installation of the system, and upon replacements during service. The amplifier 34 receives 115 volt, 400 cycle, single phase, A.-C. power from the electrical control box 36, to be described, and the low voltage, variable, thermal generated, D.-C. signal from thermocouples 32 proportional to the turbine discharge temperature. It transforms the power circuit into a 50 volt, 400 cycle, 2 phase, A.-C. control power for the motor driven valve 30, which is varied according to the low voltage thermocouple circuit fluctuations and stabilized by feed-back signals from a potentiometer mounted on the valve 30. The amplifier per se plays no part of this invention; however, for a more detailed description reference may be had to the article "Anti-Hunt Servo Amplifier," by J. F. Engelberger in the February 1950 issue of Electrical Manufacturing.

When the fuel reaches the afterburner fuel manifold it is ignited by means of two igniter plugs 37 located as shown in the afterburner housing 14 of the afterburner assembly. Plugs 37 are energized by D.-C. power from control box 36. However, in order to assure a strong, hot spark capable of instantly igniting the fuel primary engine exhaust gas mixture in the afterburner assembly, a high tension vibrator unit 38 is installed in each igniter plug circuit. These units interrupt the D.-C. input current from the control box 36 and supply a pulsating current to a transformer within each unit which raises the voltage to provide a strong, effective spark, as is more fully described in said copending application Serial No. 185,124.

Initiation of combustion in the afterburner assembly creates a change in the afterburner pressure gradient which is sensed by a pressure switch 39. Switch 39, described in detail in the Day application cited just above, is a single pole double-throw switch installed in a pressure tight cylindrical housing. The housing is divided into three separate cells by means of two flexible diaphragms and the movable common switch contact is moved between two fixed contacts by means of these diaphragms which are secured together so as to move in unison. Each of these cells is open to a different pressure region in the afterburner assembly by means of three tubing lines which connect switch 39 with the points 40, 42 and 44 located just upstream of the afterburner, just downstream of the afterburner, and just upstream of the variable area nozzle, respectively. When the afterburner is not in use or there has been a failure of combustion, the relative gas pressures in the afterburner assembly are such as to cause switch 39 to be in its no-burning position, to be designated hereinafter as the NB position of the switch. When the afterburner is in use the relative pressures in the afterburner assembly cause switch 39 to move into its afterburning position, hereinafter designated as the AB position. The switch itself is wired to the control box 36 and operates through the control box, as will be hereinafter described, to energize an actuator control valve 45.

Actuator control valve 45 is a solenoid operated four-way air valve which takes in compressed air from the discharge side of the primary engine air compressor through a port 46 and discharges it through one of two discharge lines 47 and 48. Line 47 is connected in parallel to forward or upstream fittings on both an upper and lower fluid motor 49, only one of which is shown, mounted at diametrically opposite points on the diffuser section 12. Line 48 is similarly connected in parallel to the rear fittings of the fluid motors 49. The fittings admit the pressurized air either in front of or behind cylinder pistons, not shown, which are linked by piston rods 50 to the variable area nozzle to move the eyelids 51 to move the nozzle toward open or closed positions, the latter being shown in Figure 1a. Whenever air is directed by valve 45 through one of the lines 47 or 48 the other line serves as an exhaust line exhausting the air through the valve and out line 52 to the atmosphere. The valve piston, not shown, of valve 45 is spring-loaded and normally in a position which causes air to be directed to the fluid motor 49 so that the nozzle is in its closed position, and whenever pressure switch 39 is in its NB position, this condition will not be changed. However, when switch 39 moves to its AB position valve 45 is actuated by its solenoid and its porting interconnections are shifted so that fluid motors 49 cause the nozzle to open. The nozzle will then remain open until the pressure switch moves to its NB position as will be fully described.

The novel electrical controls for the afterburner assembly control system are centered in the control box 36, Figures 1, 2 and 3, which distribute power from the aircraft electrical supply to the electrically controlled accessories. The box 36 consists of five hermetically sealed relays, R1 R2, R3, R4 and R5, Figure 3, secured to a mounting plate in the box. Leads below the plate connect the relay terminals to prong and socket receptacles 54 on the side of the box. Internal circuits in the control box are protected by a 15 amp. push-pull overload circuit breaker 55, Figure 3.

Three separately actuated devices put the control box relays in operation. These are the manual amplifier switch 56 and afterburner switch 57 in the aircraft cockpit and the automatically operated pressure switch 39. When afterburning is started by the cockpit switches control box 36 functions automatically until afterburning is manually shut down.

An afterburner fuel pump contactor 58 functions with the relays in control box 36 but is located near fuel pump 20 in order to eliminate heavy cable connections. Contactor 58 is wired between one side of the aircraft D.-C. source 59 and pump 20 but is energized through a circuit in the control box, as will be described.

As soon as the main engine throttle 60 (Figure 1), located in the cockpit, is moved from its full off position the amplifier switch 56 is closed. This occurs when the primary engine is started, and has the following results. A D.-C. circuit is completed through the closed switch 56 and the relay R1 within control box 36, Figure 3, causing relay R1 to be energized. In this circuit current from the other side of the aircraft D.-C. source 62 passes into control box 36 and through circuit breaker 55, out of the control box and through closed switch 56 and back into the control box to one side of the coil of relay R1, the other side of the coil being grounded as are the coils of all the relays. Each relay when actuated opens or closes a series of switch contacts which will be designated as normally open (NO) or normally closed (NC). Thus, when any relay is energized the NO contacts close and the NC contacts open. Therefore, when relay R1 becomes energized due to the completion of the circuit just described three NO contacts 64, 65 and 66 are closed with the following results. NO contacts 64 and 65 close applying 115 volt, 400 cycle power from the aircraft A.-C. source 67 to the fuel control amplifier 34, thus warming the amplifier tubes and readying them for immediate subsequent use. NO contact 66 closes to apply D.-C. voltage to one side of the afterburner switch 57, the current passing from D.-C. source 62 through circuit breaker 55 and contact 66. It will be noted that contact 66 is wired in such a manner that D.-C. voltage will also be applied from source 62 to contacts in other relays in control box 36 to make them ready for instant response to the various actuating circuits. Thus, the closing of amplifier switch 56 places the afterburner control system in a state of readiness so that it will respond rapidly when the afterburner is switched on.

Afterburner combustion is started by moving throttle 60 to its afterburning position or all the way to the left as viewed in Figure 1. This causes afterburner switch 57 to close with the following results. The D.-C. voltage previously applied from source 62 to one side of afterburner switch 57 will cause current to flow through the closed switch, into control box 36, through an NC contact 68 in relay R5, to the coils of relays R2 and R3 which are thereby energized. A parallel branch of the D.-C. line from relay R5 passes through relay R4 to apply a D.-C. voltage to the common switch contact of pressure switch 39. When relay R2 is energized the NO contact 69 closes and D.-C. voltage previously applied to one side of the contact causes current to flow through the closed contact and energize the solenoid of fuel shut-off valve 28 which opens the fuel line 27 between pressure operated valve 29 and the afterburner manifold; the NO contact 70 closes and D.-C. voltage previously applied to one side of the contact causes current to flow through the closed contact and energize the coil of contactor 58 which puts afterburner fuel pump 20 in operation; NO contact 72 closes, closing a line between the solenoid of actuator control valve 45 and an NO contact 74 in relay R4 so that the solenoid will be energized when relay R4 is energized, as will be explained; and, NO contact 75 closes and D.-C. voltage, previously applied to one side of the contact through an NC contact 76 in relay R4, causes current to flow through the closed contact and energize both ignition units 38. When relay R3 is energized NO contact 77 closes and D.-C. voltage previously applied to one side of the contact causes current to flow through the closed contact and actuate the aircraft fuel booster pump relay 25a so that the increased fuel flow required for afterburning is made available. The foregoing operations occur simultaneously when afterburner switch 57 is closed and result in the delivery of fuel to the afterburner manifold and ignition thereof to initiate afterburning.

When afterburner combustion is initiated, pressure switch 39 moves to its AB position due to the resultant pressure changes in the afterburner assembly as hereinbefore described. When switch 39 moves to its AB position the D.-C. voltage previously applied to the common contact causes current to flow through the AB contact and energize relay R4. It should be noted here that changes in afterburner assembly pressure conditions during normal flight may cause switch 39 to move off its AB position. Relay R4 remains energized, however, for any position of the switch once it has touched the AB position until it touches the NB position. When relay R4 is energized NO contact 78 closes energizing relay R4 directly from the parallel D.-C. line from relay R5 so that should pressure switch 39 move off its AB position relay R4 will remain energized; NO contact 79 closes, closing a line from the NB contact of switch 39 to the coil of relay R5 so that relay R5 will be energized when switch 39 moves to its NB position; NO contact 74 closes and D.-C. voltage previously applied to one side of the contact causes current to flow through previously closed contact 72 in relay R2 to energize the solenoid of actuator control valve 45 which causes the fluid motors 49 to open the variable area nozzle to accommodate afterburning; and, NC contact 76 opens to break a line supplying D.-C. voltage to one side of previously closed contact 75 in relay R2 thereby deenergizing both ignition units 38. The deenergizing of ignition units 38 as soon as combustion is safely insured is important since this source of energy is a potential source of radio or radar interference and should be kept to a minimum. The foregoing operations occur within approximately one second from the start of combustion in the afterburner assembly and result in the necessary adjustment of the variable area nozzle to compensate for the afterburning. Thus, by means of all of the foregoing operations the electrical control system in cooperation with the other units of the control system has placed the afterburner assembly in full operating condition completely automatically and within two seconds after the afterburner switch 57 was closed.

When it is desired to shut off the afterburning, the afterburner switch 57 is opened by moving throttle 60 from its afterburning position, or to the right in Figure 1. Opening switch 57 breaks the D.-C. line which passes through NC contact 68 in relay R5 to the coils of relays R2 and R3 thereby deenergizing relays R2 and R3. Since the common contact of pressure switch 39 is on a branch of this D.-C. line relay R4 will also be deenergized. Deenergizing relays R2, R3 and R4 results in the following operations which occur simultaneously and are simply the reverse of the operations described above in connection with initiating afterburning. Fuel shut-off valve 28 closes; contactor 58 is deenergized cutting off fuel pump 20; and booster pump 25 returns to normal operation. Since the fuel supply to the afterburner is cut off and the ignition means was previously deenergized combustion in the afterburner assembly will cease. In addition, the solenoid of actuator control valve 45 is deenergized causing fluid motors 49 to close the variable area nozzle to accommodate the no-burning condition, and pressure switch 39 moves to its NB position due to pressure changes in the afterburner assembly resulting from the loss of combustion. Thus, the automatic shut-off and return to no-burning condition of the afterburner assembly is completed and the assembly is in a state of readiness for use again as soon as needed. When the primary engine is also shut down amplifier switch 56 will be opened deenergizing relay R1 and fuel control amplifier 34 so that all the electrically controlled units of the afterburner assembly control system are placed in a completely deenergized condition.

The foregoing paragraph describes a normal or intentional shut down of the afterburner. However, as pointed out hereinbefore, loss of combustion in the afterburner assembly may also be unintentional due to blow out or failure of the fuel supply or the like. To avoid the sudden loss of normal thrust which would follow a loss of afterburner combustion, the following sequence of operations will automatically take place. They will only occur, however, if combustion is lost while afterburner switch 57 is closed. If switch 57 is opened the normal sequence of operation in an intentional shut down will occur. The loss of combustion results in pressure changes in the afterburner assembly which cause pressure switch 39 to move to its NB position. Movement of switch 39 to its NB position causes current to flow through NO contact 79 in relay R4 to the coil of relay R5 which is thereby energized. It will be remembered from the foregoing description that even though switch 39 has moved from its AB to its NB position relay R4 will remain energized through NO contact 78. Energizing relay R5 closes NO contact 80 causing current from the D.-C. line to relay R5 to flow through contact 80, contact 79 in relay R4 and back to the coil of relay R5 so that relay R5 will remain energized even though pressure switch 39 may move off its NB position. In addition, NC contact 68 opens breaking the D.-C. line to relays R2 and R3 so that these relays are deenergized, and the normal shut down sequence of operation then takes place. Since the afterburner switch 57 has remained closed throughout the above inadvertent shut down, afterburning may not be started again until the pilot has moved throttle 60 away from its afterburning position to open switch 57 and then moves it back again to reclose the switch and start the afterburning anew. Thus, the possibility of involuntary recycling is effectively prevented. During this operation the opening of switch 57 deenergizes relays R4 and R5 so that such a fresh start may be made.

From the foregoing description it will be apparent that my novel electrical control system provides a reliable and rapidly responsive automatically controlled medium capable of performing a multitude of operations simultaneously. In the preferred embodiment disclosed herein this control system in combination with other elements of an afterburner assembly control system allows for the safe and efficient operation of a jet engine afterburner providing completely automatic control for any condition of flight and under any emergency.

The invention may be embodied in other specific forms without departing from the spirit of my invention or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In a control system for an afterburner assembly provided with a variable area nozzle, said control system including fuel and nozzle controls, electrical controls comprising a manual switch to initiate operation of said electrical controls, first and second electric relays actuated by said switch to coact with said fuel controls to cause fuel to be pumped to said afterburner assembly and ignited therein, and a third relay responsive to pressure variations caused by combustion in said afterburner assembly to actuate said nozzle controls thereby causing adjustment of said variable area nozzle to accommodate combustion of said fuel in said afterburner assembly, each of said relays having a plurality of sets of contacts.

2. In a control system for an afterburner assembly having a variable area nozzle, said control system including fuel controls comprising a fuel booster pump, an afterburner fuel pump, a normally closed fuel shut-off valve and fuel ignition means, and nozzle controls comprising a pressure responsive switch and an actuator control valve; electrical controls comprising an afterburner switch; a first means actuated by said afterburner switch to initiate operation of said afterburner fuel pump, open said fuel shut-off valve and energize said ignition means; a second means actuated by said afterburner switch to initiate operation of said booster pump, said first and second means coacting to initiate combustion of fuel in said afterburner assembly; and a third means actuated by said pressure responsive switch, responding to pressure changes caused by combustion in said afterburner assembly, to energize said actuator control valve to cause regulation of said variable area nozzle to accommodate combustion in said afterburner assembly.

3. In a control system for an afterburner assembly having a variable area nozzle, said control system including fuel controls comprising a fuel booster pump, an afterburner fuel pump, a normally closed fuel shut-off valve and fuel ignition means, and pressure responsive nozzle controls comprising a pressure responsive switch and an actuator control valve; electrical controls comprising a manual afterburner switch; a first means actuated by said afterburner switch to initiate operation of said afterburner fuel pump, open said fuel shut-off valve and energize said ignition means; a second means actuated by said afterburner switch to initiate operation of said booster pump, said first and second means coacting to initiate combustion of fuel in said afterburner assembly; a third means actuated by said pressure responsive switch, responding to pressure changes caused by combustion in said afterburner assembly, to energize said actuator control valve to cause regulation of said variable area nozzle to accommodate combustion in said afterburner assembly; and a fourth means operable in the event of an inadvertent loss of combustion while said afterburner switch is in actuating position to cause a shut down of said actuated fuel controls and a regulation of said variable area nozzle to compensate for said loss of combustion in said afterburner assembly.

4. In a control system for an afterburner assembly having a variable area nozzle, said control system including fuel controls comprising a fuel booster pump, an afterburner fuel pump, a normally closed fuel shut-off valve, temperature sensing elements, a fuel control amplifier, a temperature responsive fuel valve and fuel ignition means, and pressure responsive nozzle controls comprising a pressure responsive switch, and nozzle operating fluid motors; electrical controls comprising a first switch; a first relay actuated by said first switch to energize said fuel control amplifier to cause it to coact with said temperature sensing elements to regulate said temperature responsive fuel valve; a second switch; a second relay actuated by said second switch to initiate operation of said afterburner fuel pump, open said shut-off valve and energize said ignition means; a third relay actuated by said second switch to initiate operation of said booster pump, said first, second and third relays coacting to initiate combustion of fuel in said afterburner assembly; and a fourth relay actuated by said pressure responsive switch, responding to pressure changes caused by combustion in said afterburner assembly, to cause said fluid motors to regulate said variable area nozzle to accommodate combustion in said afterburner assembly.

5. In a control system for an afterburner assembly having a variable area nozzle, said control system including fuel controls comprising a fuel booster pump, an afterburner fuel pump, a normally closed fuel shut-off valve, temperature sensing elements, a fuel control amplifier, a temperature responsive fuel valve and fuel ignition means, and pressure responsive nozzle controls comprising a pressure responsive switch, an actuator control valve, and nozzle operating fluid motors responsive to said actuator control valve; electrical controls comprising a throttle controlled amplifier switch; a first relay having a plurality of sets of contacts actuated by said amplifier switch to energize said fuel control amplifier to cause it to coact with said temperature sensing elements to regulate said temperature responsive fuel valves; a throttle controlled afterburner switch; a second relay having a plurality of sets of contacts actuated by said afterburner switch to initiate operation of said afterburner fuel pump, open said shut-off valve and energize said ignition means; a third relay having a plurality of sets of contacts actuated by said afterburner switch to initiate operation of said booster pump, said first, second and third relays coacting to initiate combustion of fuel in said afterburner assembly; a fourth relay having a plurality of sets of contacts actuated by said pressure responsive switch, responding to pressure changes caused by combustion in said afterburner assembly, to energize said actuator control valve to cause said fluid motors to regulate said variable area nozzle to accommodate combustion in said afterburner assembly; and a fifth relay having a plurality of sets of contacts operable in the event of an inadvertent loss of combustion while said afterburner switch is in actuating position to cause a shut down of said actuated fuel controls and a regulation of said variable area nozzle to compensate for said loss of combustion in said afterburner assembly.

References Cited in the file of this patent

UNITED STATES PATENTS

| | | |
|---|---|---|
| 2,411,895 | Poole | Dec. 3, 1946 |
| 2,498,939 | Bobier | Feb. 28, 1950 |
| 2,506,611 | Neal | May 9, 1950 |
| 2,514,248 | Lombard | July 4, 1950 |
| 2,514,393 | Hutchinson | July 11, 1950 |
| 2,514,513 | Price | July 11, 1950 |
| 2,520,434 | Robson | Aug. 29, 1950 |
| 2,520,967 | Schmitt | Sept. 5, 1950 |